US012681244B2

(12) United States Patent
Li et al.

(10) Patent No.: US 12,681,244 B2
(45) Date of Patent: Jul. 14, 2026

(54) PHOTONIC ALIGNMENT DEVICE AND METHOD

(71) Applicant: Intel Corporation, Santa Clara, CA (US)

(72) Inventors: Yonggang Li, Chandler, AZ (US); Bai Nie, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/091,430

(22) Filed: Dec. 30, 2022

(65) Prior Publication Data

US 2024/0219653 A1      Jul. 4, 2024

(51) Int. Cl.
*G02B 6/42* (2006.01)
(52) U.S. Cl.
CPC .................................. *G02B 6/4212* (2013.01)
(58) Field of Classification Search
CPC ...... G02B 6/262; G02B 6/264; G02B 6/2848; G02B 6/30; G02B 6/325; G02B 6/327; G02B 6/4212; G02B 6/4214

USPC ................................... 385/31, 33, 36, 49, 50
See application file for complete search history.

(56) References Cited

U.S. PATENT DOCUMENTS

| | | | | |
|---|---|---|---|---|
| 2009/0303580 | A1* | 12/2009 | Popp | G02B 6/3604 |
| | | | | 359/346 |
| 2011/0180815 | A1* | 7/2011 | Miyatake | G02B 6/43 |
| | | | | 257/E21.328 |
| 2022/0057586 | A1* | 2/2022 | Ahmad | G02B 6/43 |
| 2022/0196918 | A1* | 6/2022 | Lin | G02B 6/4243 |
| 2023/0012157 | A1* | 1/2023 | Yu | G02B 6/12002 |

* cited by examiner

*Primary Examiner* — Robert Tavlykaev
(74) *Attorney, Agent, or Firm* — Compass IP Law PC

(57) ABSTRACT

An electronic device and associated methods are disclosed. In one example, the electronic device includes a photonic die and at least one optical fiber. Devices and methods are shown that include an optical coupler and one or more correction regions to align a beam between the photonic die and the optical fiber.

20 Claims, 4 Drawing Sheets

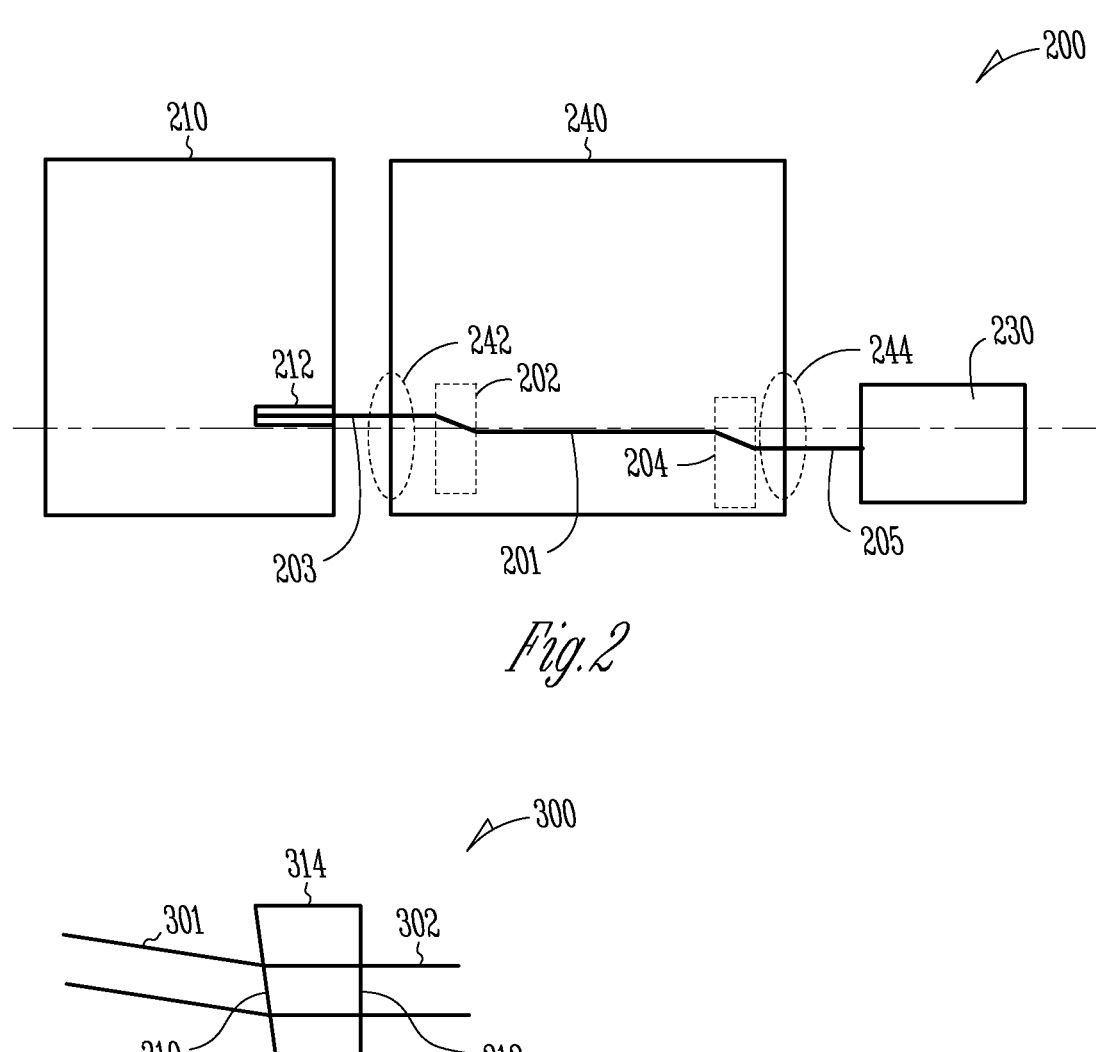
*Fig.2*
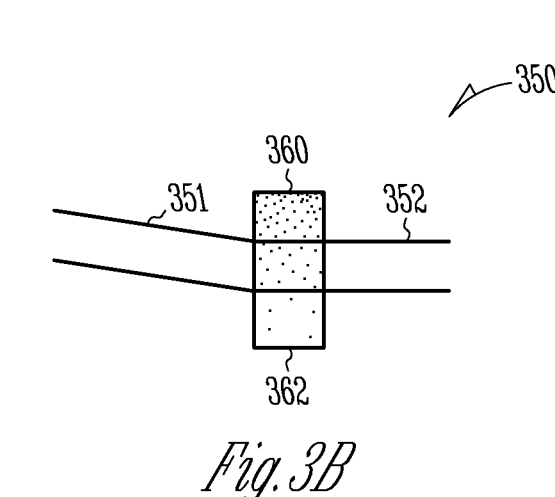
*Fig.3A*
*Fig.3B*

_402_

PLACING AN OPTICAL FIBER ADJACENT
TO AN OPTICAL PORT OF A PHOTONIC DIE

_404_

PLACING AN OPTICAL COUPLER BETWEEN THE
OPTICAL FIBER AND THE OPTICAL PORT

_406_

FORMING ONE OR MORE CORRECTION REGIONS
BETWEEN A FIRST END AND A SECOND END OF
THE OPTICAL COUPLER TO MODIFY A BEAM PATH
FROM THE OPTICAL PORT TO THE OPTICAL FIBER

PHOTONIC ALIGNMENT DEVICE AND METHOD

TECHNICAL FIELD

Example devices and methods described herein generally relate to semiconductor devices. In one example, devices and methods described include one or more photonic devices.

BACKGROUND

Semiconductor devices that include one or more photonic dies are described. When a photonic die is attached to a substrate, alignment of an optical port that transmits and/or receives data signals can be difficult. It is desired to have device components, arrangements and methods that address these concerns, and other technical challenges.

BRIEF DESCRIPTION OF THE DRAWINGS

FIG. 2 shows portions of selected components of a photonic device in accordance with some example embodiments.

FIG. 3A shows a correction region in accordance with some example embodiments.

FIG. 3B shows another correction region in accordance with some example embodiments.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
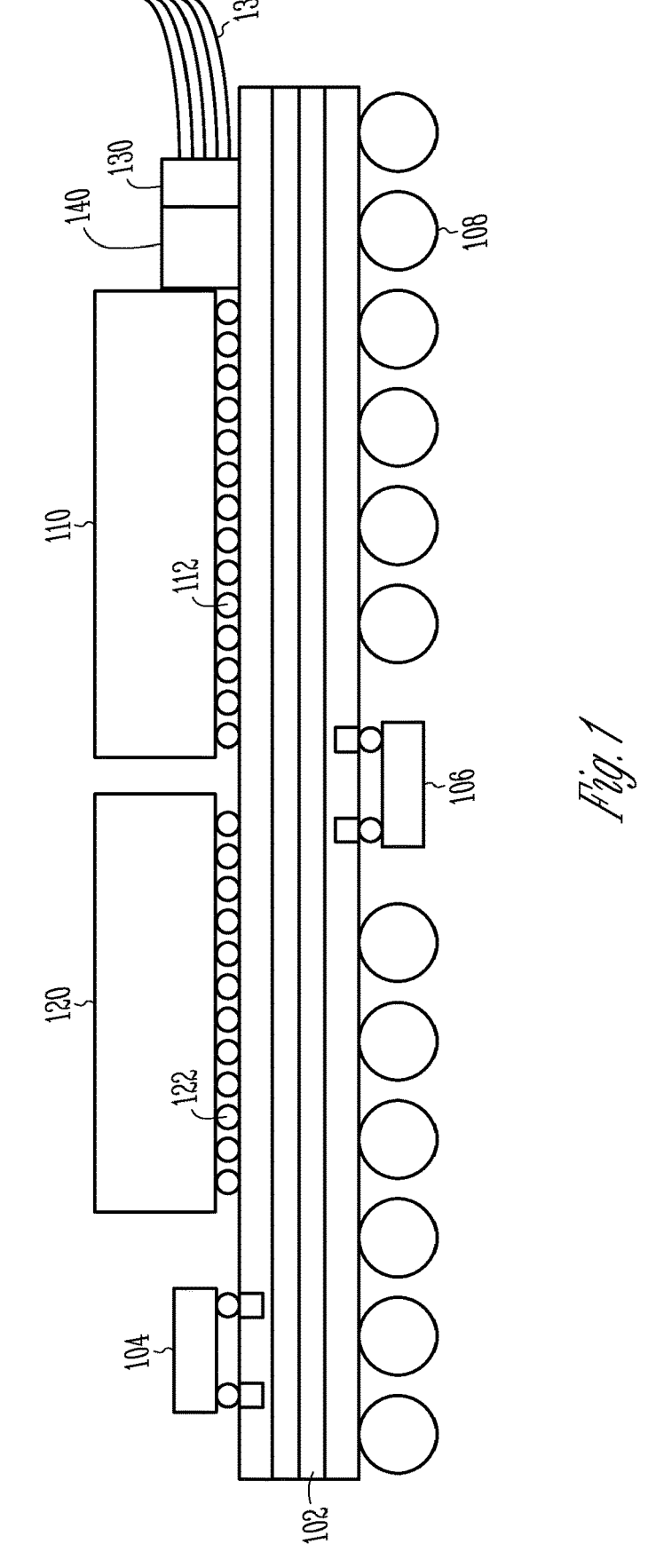
FIG. 1 shows a photonic device in accordance with some example embodiments.

FIG. 1 shows a semiconductor device 100 according to one example. The semiconductor device 100 includes a photonic die 110 coupled to a substrate 102. In the example of FIG. 1, the photonic die 110 is coupled to the substrate 102 through an array of solder connections 112.

In one example, the substrate 102 includes a plurality of layers such as dielectric layers and conductor layers with conductive vias interconnecting between conductor traces. In one example, the substrate 102 translates a pitch of the solder connections 112 into a larger pitch of substrate connections 108. The substrate connections 108 may also include solder, and can be used to connect to other circuit boards, such as a motherboard (not shown).

The semiconductor device 100 of FIG. 1 further includes an optical fiber array 130 located adjacent to an optical port of the photonic die 110. An optical coupler 140 is shown located between the optical fiber array 130 and the photonic die 110. In one example, the optical coupler includes structures and materials as described in examples below that are configured to collimate and direct a photonic beam between the photonic die 110 and the optical fiber array 130. Photonic beams can be used to carry information between the photonic die 110 and other devices that are coupled to distal ends of fibers 132 in the optical fiber array 130.

The semiconductor device 100 of FIG. 1 further includes an electronic semiconductor die 120. The electronic semiconductor die 120 is described in contrast to the photonic die 110, in that the electronic semiconductor die 120 exchanges data through electrical pathways in contrast to photonic data.

In one example, the semiconductor device 100 further includes one or more capacitors coupled to the substrate 102. FIG. 1 shows an example die side capacitor 104 and a land side capacitor 106. Inclusion of capacitors on a substrate can provide a power regulation function for dies such as photonic die 110 and electronic semiconductor die 120.

FIG. 2 shows a photonic device 200. The photonic device 200 includes a photonic die 210, and an optical fiber array 230 with an optical coupler 240. In one example, the photonic device 200 is similar to the photonic die 110, the optical fiber array 130 and the optical coupler 140 from FIG. 1. The photonic die 210 of FIG. 2 shows an optical port 212. A first portion 203 of a beam path is shown as it exits/enters the optical port 212.

It can be challenging to exactly align a beam path from an optical port 212 of a photonic die 210 with one or more optical fibers—for example an array of optical fibers in an array 230 as shown. Manufacturing tolerances precise enough to provide sufficient alignment are expensive and/or difficult. Example configurations of optical couplers described reduce manufacturing cost and complexity in alignment.

In FIG. 2, the optical coupler 240 includes a transparent material having a first index of refraction. In one example, the optical coupler 240 includes glass. In one example, the optical coupler 240 includes fused silica. Although the examples given include silicon and oxygen, the invention is not so limited. Any transparent material capable of modification as described are within the scope of the invention. In one example, the optical coupler 240 is a monolithic transparent material. In one example, the optical coupler 240 includes a transparent material portion, along with other layers or structures.

In the example of FIG. 2, a first lens 242 and a second lens 244 are shown. In one example, the first and second lens 242, 244 are integral with the transparent material of the optical coupler 240. In one example, the first and second lens 242, 244 are separately formed and attached to the optical coupler 240. The inclusion of lenses helps to collimate a beam into a discrete beam path.

A first correction region 202 is shown along the beam path. In one example, the first correction region 202 includes a second index of refraction different than the first index of refraction. In the example of FIG. 2, the first portion 203 of the beam path is corrected by an angle as it passes through the first correction region 202, and is now redirected to a second portion 201 of the beam path. One of ordinary skill in the art, having the benefit of the present disclosure, will recognize that the difference in index of refraction, combined with a geometry of the first correction region 202 lead to the redirection of the beam path.

In the example of FIG. 2, a second correction region 204 is shown along the beam path. In one example, the second correction region 204 includes a third index of refraction different than the first index of refraction. In one example, the third index of refraction is the same as the second index of refraction, although the invention is not so limited. In one example, a geometry of the second correction region 204 is the same as the first correction region 202, although the invention is not so limited.

In the example of FIG. 2, the second portion 201 of the beam path is corrected by an angle as it passes through the second correction region 204, and is now redirected to a third portion 205 of the beam path. One of ordinary skill in the art will recognize that while the beam path is described in FIG. 2 from left to right, that signals will travel in both directions, to and from the optical port 212 of the photonic die 210.

By utilizing one or more correction regions 202, 204, a beam path between the optical port 212 of the photonic die 210 and one or more optical fibers can be adjusted. As discussed above, placement of components such as the photonic die 210, the optical fiber array 230, and the optical coupler 240 may not be as precise as desired after initial placement. In one example, after initial placement, one or more correction regions 202, 204 are formed to compensate for any misalignment.

In one example, a laser modification is performed at a focused location on or within the optical coupler 240 to form the one or more correction regions 202, 204. One example of this modification is referred to as a "laser direct write" operation. The local absorption of laser energy modifies an index of refraction in a local region of a transparent material of the optical coupler 240. In one example, the laser modification is on a surface of a transparent material of the optical coupler 240. In one example, due to the ability to focus laser energy within a transparent material, the laser modification is within an interior a transparent material of the optical coupler 240.

In manufacturing, after initial placement of components such as the photonic die 210, the optical fiber array 230, and the optical coupler 240, a signal strength can be measured at the optical fiber array 230 or at the photonic die 210 depending on where a source of optical signal is coming from. Creation of, and in-situ modification of one or more correction regions 202, 204 is then performed, and can be monitored and adjusted to bring a signal strength within acceptable parameters.

FIG. 3A shows one example of a correction region 300. The example correction region 300 can be used as one or more of correction regions 202, 204 from FIG. 2. The correction region 300 includes a tapered cross section. As shown in FIG. 3A, a first side 310 and a second side 312 are shown as intersecting beam paths 301 and 302. In one example the first side 310 is angled with respect to a first beam path 301 and the second side 312 is generally normal to a second beam path 302. In the example, of FIG. 3A, a generally isotropic region 314 forms the correction region 300, and an adjustment of geometry of the isotropic region 314 changes an alignment between the first beam path 301 and the second beam path 302. The isotropic region 314 includes substantially the same index of refraction across all portions of the isotropic region 314. As illustrated, one example of varying geometry includes angling of one side (e.g. 310) while the other side remains normal to a beam. Other examples of varying geometry include angling both sides, or shaping one or more sides in more complex geometries such as arcs. Control of laser movement and laser energy through an optical coupler is used to form the geometries of the correction region 300 as described.

FIG. 3B shows another example of a correction region 350. The example correction region 350 can be used as one or more of correction regions 202, 204 from FIG. 2. The correction region 350 includes a gradient of refractive index.

The correction region 350 of FIG. 3B is formed such that a refractive index at a top 360 is different than a refractive index at a bottom 362. Although a gradient from top 360 to bottom 362 is used as an example, other gradients are also within the scope of the invention. In operation the gradient of index of refraction changes an alignment between a first beam path 351 and a second beam path 352.

Although geometry changes are described in the example of FIG. 3A, and gradients of index of refraction are described in the example of FIG. 3B, these techniques are not exclusive. In one example both geometry variations and gradients of index of refraction are used to form a single correction region. Although examples such as FIG. 2 show two correction regions, the invention is not so limited. Some examples include only one correction region, while other examples include more than two correction regions.

Figure 4:
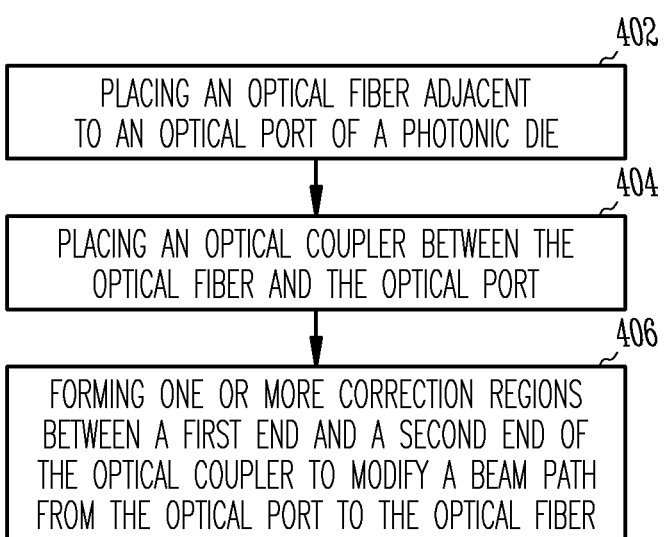
FIG. 4 shows a flow diagram of a method of manufacture of a photonic device in accordance with some example embodiments.

FIG. 4 shows a flow diagram of an example method of manufacture. In operation 402, an optical fiber is placed adjacent to an optical port of a photonic die. In operation 404, an optical coupler is placed between the optical fiber and the optical port, and in operation 406, one or more correction regions are formed between a first end and a second end of the optical coupler to modify a beam path from the optical port to the optical fiber.

While laser modification is used as an example to form correction regions, the invention is not so limited. Other techniques such as doping or implantation are also possible. One advantage of laser modification includes the ability to adjust each device quickly and cheaply during manufacture and to align each different device to address different misalignment issues.

Figure 5:
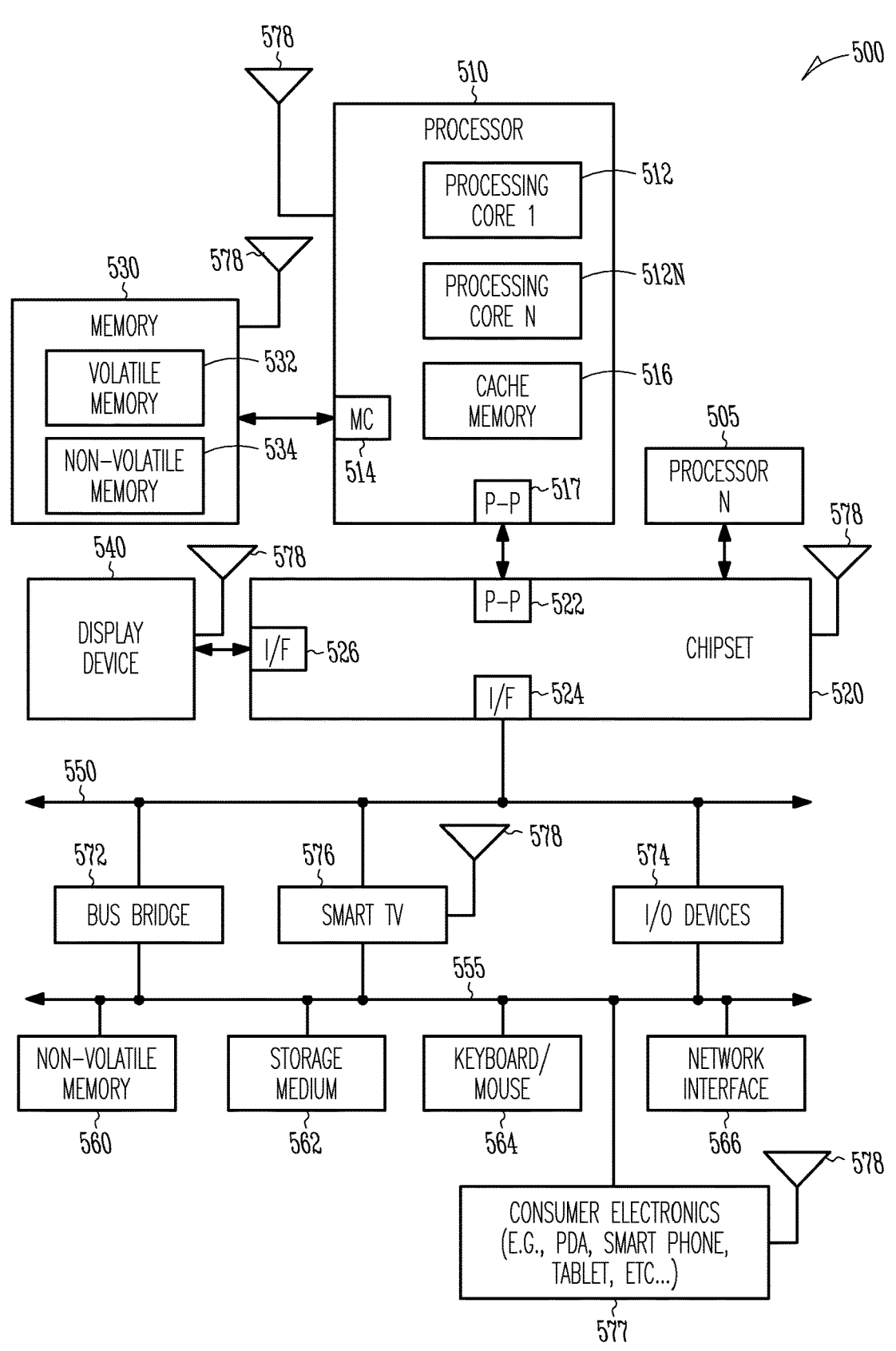
FIG. 5 shows a system that may incorporate photonic devices and methods, in accordance with some example embodiments.

FIG. 5 illustrates a system level diagram, depicting an example of an electronic device (e.g., system) that may include a photonic die and an optical coupler with one or more correction features as described above. In one embodiment, system 500 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 500 includes a system on a chip (SOC) system.

In one embodiment, processor 510 has one or more processor cores 512 and 512N, where 512N represents the Nth processor core inside processor 510 where N is a positive integer. In one embodiment, system 500 includes multiple processors including 510 and 505, where processor 505 has logic similar or identical to the logic of processor 510. In some embodiments, processing core 512 includes, but is not limited to, pre-fetch logic to fetch instructions, decode logic to decode the instructions, execution logic to execute instructions and the like. In some embodiments, processor 510 has a cache memory 516 to cache instructions and/or data for system 500. Cache memory 516 may be organized into a hierarchal structure including one or more levels of cache memory.

In some embodiments, processor 510 includes a memory controller 514, which is operable to perform functions that enable the processor 510 to access and communicate with memory 530 that includes a volatile memory 532 and/or a non-volatile memory 534. In some embodiments, processor 510 is coupled with memory 530 and chipset 520. Processor 510 may also be coupled to a wireless antenna 578 to communicate with any device configured to transmit and/or receive wireless signals. In one embodiment, an interface for wireless antenna 578 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 532 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 534 includes, but is not limited to, flash memory, phase change memory (PCM), read-only memory (ROM), electrically erasable programmable read-only memory (EEPROM), or any other type of non-volatile memory device.

Memory 530 stores information and instructions to be executed by processor 510. In one embodiment, memory 530 may also store temporary variables or other intermediate information while processor 510 is executing instructions. In the illustrated embodiment, chipset 520 connects with processor 510 via Point-to-Point (PtP or P-P) interfaces 517 and 522. Chipset 520 enables processor 510 to connect to other elements in system 500. In some embodiments of the example system, interfaces 517 and 522 operate in accordance with a PtP communication protocol such as the Intel® QuickPath Interconnect (QPI) or the like. In other embodiments, a different interconnect may be used.

In some embodiments, chipset 520 is operable to communicate with processor 510, 505N, display device 540, and other devices, including a bus bridge 572, a smart TV 576, I/O devices 574, nonvolatile memory 560, a storage medium (such as one or more mass storage devices) 562, a keyboard/mouse 564, a network interface 566, and various forms of consumer electronics 577 (such as a PDA, smart phone, tablet etc.), etc. In one embodiment, chipset 520 couples with these devices through an interface 524. Chipset 520 may also be coupled to a wireless antenna 578 to communicate with any device configured to transmit and/or receive wireless signals. In one example, any combination of components in a chipset may be separated by a continuous flexible shield as described in the present disclosure.

Chipset 520 connects to display device 540 via interface 526. Display 540 may be, for example, a liquid crystal display (LCD), a light emitting diode (LED) array, an organic light emitting diode (OLED) array, or any other form of visual display device. In some embodiments of the example system, processor 510 and chipset 520 are merged into a single SOC. In addition, chipset 520 connects to one or more buses 550 and 555 that interconnect various system elements, such as I/O devices 574, nonvolatile memory 560, storage medium 562, a keyboard/mouse 564, and network interface 566. Buses 550 and 555 may be interconnected together via a bus bridge 572.

In one embodiment, mass storage device 562 includes, but is not limited to, a solid state drive, a hard disk drive, a universal serial bus flash memory drive, or any other form of computer data storage medium. In one embodiment, network interface 566 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 5 are depicted as separate blocks within the system 500, the functions performed by some of these blocks may be integrated within a single semiconductor circuit or may be implemented using two or more separate integrated circuits. For example, although cache memory 516 is depicted as a separate block within processor 510, cache memory 516 (or selected aspects of 516) can be incorporated into processor core 512.

To better illustrate the method and apparatuses disclosed herein, a non-limiting list of embodiments is provided here:

Example 1 includes a photonic device. The photonic device includes a photonic die having an optical port, an optical fiber having an end adjacent to the optical port, an optical coupler located between the optical fiber and the optical port, the optical coupler including a transparent material having a first index of refraction, a beam path through the transparent material of the optical coupler. The photonic device also includes one or more correction regions along the beam path, the one or more correction regions having a second index of refraction different than the first index of refraction.

Example 2 includes the photonic device of example 1, wherein the optical fiber is part of an optical fiber array.

Example 3 includes the photonic device of any one of examples 1-2, further including a lens at an interface between the optical coupler and the optical port.

Example 4 includes the photonic device of any one of examples 1-3, further including a lens at an interface between the optical coupler and the optical fiber.

Example 5 includes the photonic device of any one of examples 1-4, wherein the one or more correction regions includes two correction regions.

Example 6 includes the photonic device of any one of examples 1-5, wherein the one or more correction regions includes a tapered cross section.

Example 7 includes the photonic device of any one of examples 1-6, wherein the one or more correction regions includes a gradient of refractive index.

Example 8 includes a semiconductor device. The semiconductor device includes a photonic die coupled to a substrate, the photonic die having an optical port, an electronic die coupled to the substrate and electrically connected to the photonic die, and an optical fiber having an end adjacent to the optical port. The semiconductor device also includes an optical coupler located between the optical fiber and the optical port, the optical coupler including a transparent material having a first index of refraction. The semiconductor device also includes a beam path through the transparent material of the optical coupler, and one or more correction regions along the beam path, the one or more correction regions having a second index of refraction different than the first index of refraction.

Example 9 includes the semiconductor device of example 8, further including one or more capacitors coupled to the substrate.

Example 10 includes the semiconductor device of any one of examples 8-9, wherein the photonic die and the electronic die are on a first side of the substrate.

Example 11 includes the semiconductor device of any one of examples 8-10, further including solder connections on a second side of the substrate opposite the photonic die and the electronic die.

Example 12 includes the semiconductor device of any one of examples 8-11, wherein the one or more correction regions includes two correction regions.

Example 13 includes the semiconductor device of any one of examples 8-12, wherein the one or more correction regions includes a tapered cross section.

Example 14 includes the semiconductor device of any one of examples 8-13, wherein the one or more correction regions includes a gradient of refractive index.

Example 15 is a method of forming a semiconductor device. The method includes placing an optical fiber adjacent to an optical port of a photonic die, placing an optical coupler between the optical fiber and the optical port, and forming one or more correction regions between a first end and a second end of the optical coupler to modify a beam path from the optical port to the optical fiber.

Example 16 includes the method of example 15, wherein forming one or more correction regions includes using a laser to modify an index of refraction in the optical coupler locally at the one or more correction regions.

Example 17 includes the method of any one of examples 15-16, wherein forming one or more correction regions includes forming two correction regions.

Example 18 includes the method of any one of examples 15-17, wherein forming one or more correction regions includes modifying an index of refraction in the optical coupler to form a gradient of index of refraction within the one or more correction regions.

Example 19 includes the method of any one of examples 15-18, wherein forming one or more correction regions includes modifying an index of refraction in the optical coupler to form a wedge shaped correction region.

Example 20 includes the method of any one of examples 15-19, wherein forming one or more correction regions includes modifying an index of refraction within an interior of the optical coupler.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. A photonic device, comprising:
   a photonic die having an optical port;

an optical fiber having an end adjacent to the optical port;

an optical coupler located between the optical fiber and the optical port, the optical coupler including a transparent material having a first index of refraction;

a beam path through the transparent material of the optical coupler; and one or more correction regions along the beam path, the one or more correction regions having a second index of refraction different than the first index of refraction wherein the second index of refraction is capable of being modified in the photonic device to increase coupling efficiency between the optical fiber and the optical port.

2. The photonic device of claim 1, wherein the optical fiber is part of an optical fiber array.

3. The photonic device of claim 1, further including a first lens at an interface between the optical coupler and the optical port.

4. The photonic device of claim 3, further including a second lens at an interface between the optical coupler and the optical fiber.

5. The photonic device of claim 1, wherein the one or more correction regions includes two correction regions.

6. The photonic device of claim 1, wherein the one or more correction regions includes a tapered cross section.

7. The photonic device of claim 1, wherein the one or more correction regions includes a gradient of refractive index.

8. A semiconductor device, comprising:

a photonic die coupled to a substrate, the photonic die having an optical port;

an electronic die coupled to the substrate and electrically connected to the photonic die;

an optical fiber having an end adjacent to the optical port;

an optical coupler located between the optical fiber and the optical port, the optical coupler including a transparent material having a first index of refraction;

a beam path through the transparent material of the optical coupler; and one or more correction regions along the beam path, the one or more correction regions having a second index of refraction different than the first index of refraction wherein the second index of refraction is capable of being modified in the semiconductor device to increase coupling efficiency between the optical fiber and the optical port.

9. The semiconductor device of claim 8, further including one or more capacitors coupled to the substrate.

10. The semiconductor device of claim 8, wherein the photonic die and the electronic die are on a first side of the substrate.

11. The semiconductor device of claim 8, further including solder connections on a second side of the substrate opposite the photonic die and the electronic die.

12. The semiconductor device of claim 8, wherein the one or more correction regions includes two correction regions.

13. The semiconductor device of claim 8, wherein the one or more correction regions includes a tapered cross section.

14. The semiconductor device of claim 8, wherein the one or more correction regions includes a gradient of refractive index.

15. A method of forming a semiconductor device, comprising:

placing an optical fiber adjacent to an optical port of a photonic die;

placing an optical coupler between the optical fiber and the optical port; and after placing the optical fiber and the optical coupler, forming one or more correction regions between a first end and a second end of the optical coupler to modify a beam path between the optical port and the optical fiber.

16. The method of claim 15, wherein forming one or more correction regions includes using a laser to modify an index of refraction in the optical coupler locally at the one or more correction regions.

17. The method of claim 15, wherein forming one or more correction regions includes forming two correction regions.

18. The method of claim 16, wherein forming one or more correction regions includes modifying an index of refraction in the optical coupler to form a gradient of index of refraction within the one or more correction regions.

19. The method of claim 16, wherein forming one or more correction regions includes modifying an index of refraction in the optical coupler to form a wedge shaped correction region.

20. The method of claim 16, wherein forming one or more correction regions includes modifying an index of refraction within an interior of the optical coupler.

* * * * *